United States Patent
Nachtrab et al.

[11] Patent Number: 5,888,468
[45] Date of Patent: Mar. 30, 1999

[54] METHOD FOR PRODUCING SILICON TETRAFLUORIDE FROM URANIUM TETRAFLUORIDE

[75] Inventors: William T. Nachtrab, Maynard; John B. Bulko, Franklin, both of Mass.

[73] Assignee: Starmet Corp., Concord, Mass.

[21] Appl. No.: 92,829

[22] Filed: Jun. 5, 1998

[51] Int. Cl.$^6$ .............................. C01B 33/08; C01G 43/01
[52] U.S. Cl. .......................... 423/341; 423/260; 423/261
[58] Field of Search .................................... 423/341, 342, 423/259, 260, 261

[56] References Cited

U.S. PATENT DOCUMENTS

| | | | |
|---|---|---|---|
| 2,711,361 | 6/1955 | Morris | 423/260 |
| 2,863,824 | 12/1958 | Grosse et al. | 423/341 |
| 2,907,629 | 10/1959 | Smiley et al. | 423/259 |
| 3,179,491 | 4/1965 | Ukaji et al. | 423/261 |
| 4,382,071 | 5/1983 | Otsuka et al. | 423/341 |
| 4,412,861 | 11/1983 | Kreuzmann | 75/399 |
| 4,470,959 | 9/1984 | Talwar et al. | 423/341 |
| 4,615,872 | 10/1986 | Porcham | 423/341 |

FOREIGN PATENT DOCUMENTS

| | | |
|---|---|---|
| 3841 222 A1 | 6/1990 | Germany. |
| 3841209 A1 | 6/1990 | Germany. |
| 3841212 A1 | 6/1990 | Germany. |
| 3841218 A1 | 6/1990 | Germany. |
| 3841220 A1 | 6/1990 | Germany. |

OTHER PUBLICATIONS

Katz, Joseph J. and Rabinowitch, Eugene, "The Chemistry of Uranium", Part I, The Element, Its Binary and Related Compounds, 1951, p. 376, no month.

Boissin, P. et al., "Tucson–WM98 Uranium Hexafluoride Industrial Defluorination", 1998, pp. 1–8, no month.

*Primary Examiner*—Ngoc-Yen Nguyen
*Attorney, Agent, or Firm*—Iandiorio & Teska

[57] ABSTRACT

A method for producing silicon tetrafluoride includes combining uranium tetrafluoride and silicon dioxide; heating the combination below the melting point of the uranium tetrafluoride to sufficiently react the uranium tetrafluoride and the silicon dioxide to produce non-radioactive silicon tetrafluoride and an oxide of uranium; and removing the silicon tetrafluoride.

13 Claims, 7 Drawing Sheets

METHOD FOR PRODUCING SILICON TETRAFLUORIDE FROM URANIUM TETRAFLUORIDE

FIELD OF INVENTION

This invention relates to a method for producing silicon tetrafluoride and more particularly to a method for producing silicon tetrafluoride from uranium tetrafluoride without radioactive carryover.

BACKGROUND OF INVENTION

Silicon tetrafluoride is widely used in the manufacturer of semi-conductor chips, pyrogenic silica, and other industrially important chemicals.

Silicon tetrafluoride can be produced in several ways all of which are based on reacting silica ($SiO_2$) with either hydrofluoric acid (HF) or fluorosilicic acid ($H_2SiF_6$). Thus to produce $SiF_4$ from $SiO_2$, the production of either hydrofluoric or fluorosilicic acid intermediate is required.

Current processes to produce $SiF_4$ in, varying degrees of purity, include the reaction of silica with hydrogen fluoride gas according to the reaction:

$$SiO_2(s) + 4HF(g) \rightarrow SiF_4(g) + 2H_2O$$

See U.S. Pat. No. 4,382,071.

Purity of the $SiF_4$ is dependent on the source of the silica and hydrogen fluoride reagents. The reaction is typically carried out at 25°–55° C. in concentrated sulfuric acid (>80% $H_2SO_4$) in order to diminish the reverse reaction through capture of the product $H_2O$. This process also uses large amounts of anhydrous HF which raises concerns for corrosion, safety and environmental management.

Production of $SiF_4$ from fluorosilicic acid can be accomplished according to the reaction:

$$SiO_2(s) + 2H_2SiF_6(aq) \rightarrow 3SiF_4(g) + 2H_2O$$

See U.S. Pat. No. 4,470,959. This reaction is also carried out in concentrated sulfuric acid (>80% $H_2SO_4$), but usually at a slightly higher temperature, between 25°–95° C.

It is also possible to produce $SiF_4$ directly from fluorosilicic acid by thermal decomposition:

$$H_2SiF_6(aq) \rightarrow SiF_4(g) + 2HF(g)$$

However, typical input fluorosilicic acid (20–30% aqueous) comes from fertilizer and phosphoric acid/super phosphate manufacturing waste tails. The fluorosilicic acid is generally low grade containing many impurities such as phosphorus, nitrogen and sulfur, all of which are detrimental to producing high purity $SiF_4$.

Yet, another multi-step process for producing $SiF_4$ utilizes the reaction of fluorosilicic acid with sodium fluoride and silicon dioxide according to the reaction:

$$2H_2SiF_6(aq) + 6NaF + SiO_2 \rightarrow 3Na_2SiF_6(s) + 2H_2O$$

followed by thermal treatment of the fluorosilicate salt at 600° C. to release $SiF_4$ according to the reaction:

$$Na_2SiF_6 \rightarrow SiF_4(g) + 2NaF$$

See U.S. Pat. No. 4,615,872.

As with the processes discussed above, this introduces impurities through use of low grade fluorosilicic acid diminishing the purity of the silicon tetrafluoride produced.

Uranium is a naturally occurring element which is comprised of approximately 0.7% $^{235}U$ and 99.3% $^{238}U$. $^{235}U$ is used to produce Nuclear Energy, while $^{238}U$ is not. Because of the low percentage of $^{235}U$ found in naturally occurring uranium, naturally occurring uranium must be enriched in order to obtain sufficient amounts of $^{235}U$ which will support nuclear fission. This enrichment process, aside from producing high concentrations of $^{235}U$, produces huge amounts of depleted uranium hexafluoride ($UF_6$) by-product which is a very hazardous compound posing a serious health threat. Since depleted uranium metal is radioactive and expensive to produce, it is used in limited quantities for highly specialized applications. Accordingly, alternative uses are needed in order to avoid having to dispose of the $UF_6$ at great expense by storing it indefinitely.

One solution to reducing the large stores of $UF_6$ is to reduce $UF_6$ to $UF_4$ and convert the $UF_4$ into $SiF_4$, and an oxide of uranium, e.g. $UO_2$ or $U_3O_8$.

One use for uranium oxide is to add it to the concrete which is used to build bunkers in which radioactive waste is stored in order to provide high density shielding for the stored high level radioactive waste. Uranium oxide possesses outstanding radioactive shielding properties, and when added to concrete in the form of aggregate makes a very effective, low cost shielding material.

Thus, the use of $UF_4$ as the fluorine source for production of silicon tetrafluoride eliminates the problems of impurities introduced by the use of fluorosilicic acid, and the expense and safety hazards associated with handling anhydrous HF. $UF_4$ is a relatively inert solid that is easy to handle with proper precaution for containment of low level radioactive materials. $UF_4$ is also produced in very high purity, being derived from the highly refined $UF_6$. Thus, the uses of $UF_4$ has both technical and economic advantages in the production of high purity $SiF_4$.

SUMMARY OF INVENTION

It is therefore an object of this invention to provide an improved method for producing silicon tetrafluoride.

It is a further object of the present invention to provide such a method which produces silicon tetrafluoride from uranium tetrafluoride.

It is a further object of the present invention to provide such a method which produces silicon tetrafluoride from uranium tetrafluoride without radioactive carryover.

It is a further object of the present invention to provide such a method which produces silicon tetrafluoride which is essentially pure.

It is a further object of the present invention to provide such a method which completely reacts the uranium tetrafluoride into uranium oxide.

It is a further object of the present invention to provide such a method which is cost effective to implement.

The invention results from the realization that a truly efficient and cost effective method for producing silicon tetrafluoride can be achieved by combining uranium tetrafluoride and silicon dioxide as an oxidizing agent, silicon dioxide having a lower thermodynamic stability than any oxide of uranium produced, in stoichiometric proportion so that when the combination is heated to a temperature below the melting point of the uranium tetrafluoride, the uranium tetrafluoride completely reacts with the silicon dioxide to produce silicon tetrafluoride which is free from radioactive carryover and is essentially pure.

The invention features a method for producing silicon tetrafluoride including combining uranium tetrafluoride and silicon dioxide, heating the combination below the melting point of the uranium tetrafluoride to sufficiently react the uranium tetrafluoride and the silicon dioxide to produce non-radioactive silicon tetrafluoride and an oxide of uranium and removing the silicon tetrafluoride.

In a preferred embodiment combining may include combining the uranium tetrafluoride and the silicon dioxide in stoichiometric proportion. Oxygen may be introduced to the reaction. Removing may include scrubbing the silicon tetrafluoride. Scrubbing may include reacting the silicon tetrafluoride with potassium fluoride. Scrubbing may include reacting the silicon tetrafluoride with an alkaline metal fluoride the alkaline metal fluoride may include sodium fluoride, lithium fluoride or barium fluoride. Heating may include heating the combination in the temperature range of 400° C. to 750° C. The oxide of uranium oxide produced may include $U_3O_8$. The oxide of uranium may include $UO_2$. The uranium tetrafluoride may include powdered uranium tetrafluoride. The silicon dioxide may include fumed silica. The silicon dioxide may include a mixture of quartz, cristobalite, tridymite, lechatelierite, stishovite, chalcedony, or coesite. The silicon dioxide may include silica glass.

The invention also features silicon tetrafluoride produced by combining uranium tetrafluoride and silicon dioxide, heating the combination below the melting point of the uranium tetrafluoride to sufficiently react the uranium tetrafluoride and the silicon dioxide to produce non-radioactive silicon tetrafluoride and an oxide of uranium, and removing the silicon tetrafluoride.

BRIEF DESCRIPTION OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
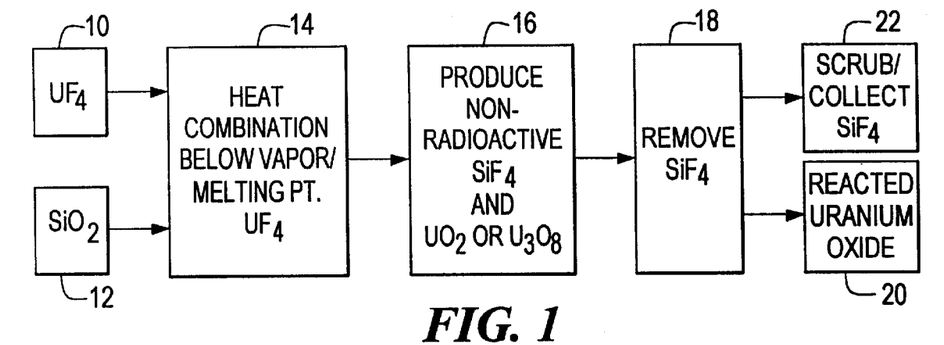
FIG. 1 is a block diagram of the method for producing silicon tetrafluoride according to the present invention.

Uranium hexafluoride $UF_6$ is reacted with hydrogen $H_2$ to produce uranium tetrafluoride ($UF_4$) 10, FIG. 1. The $UF_4$ 10 is combined with silicon dioxide ($SiO_2$) 12 as an oxidizing agent. $SiO_2$ is common silica sand and is very abundant and relatively inexpensive. The combination is heated 14 below the melting point of $UF_4$ 10 to produce silicon tetrafluoride ($SiF_4$) and an oxide of uranium 16 without uranium carry-over into the $SiF_4$. The non-radioactive $SiF_4$ is then removed 18 leaving only the completely reacted uranium oxide 20. The $SiF_4$ is then scrubbed and collected 22.

Figure 2:
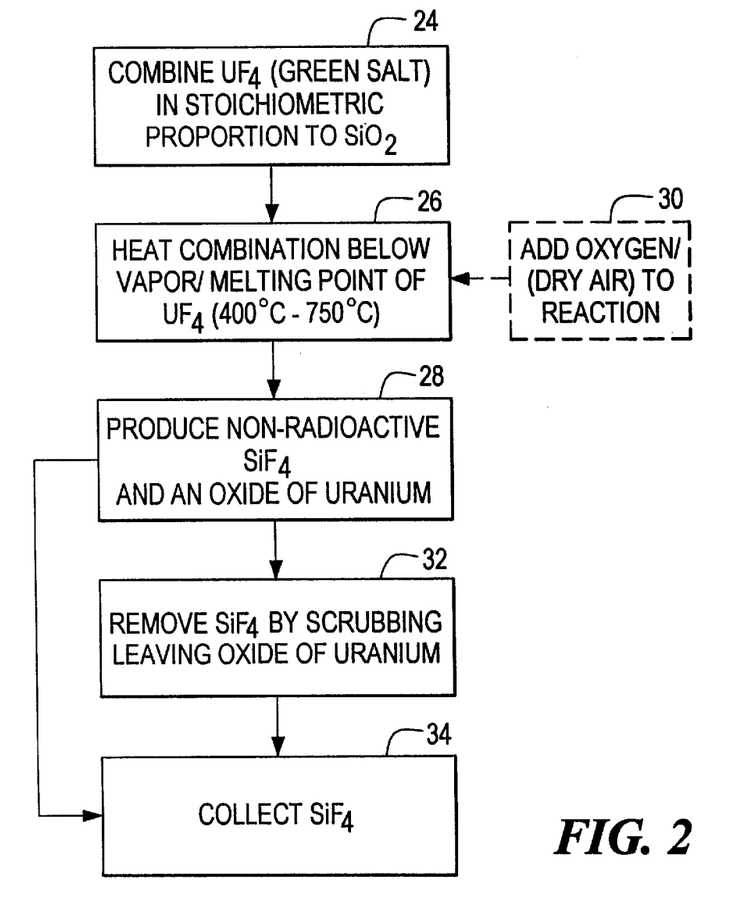
FIG. 2 is a flow chart of the method for producing silicon tetrafluoride according to the present invention.

The $UF_4$, or green salt, which may be granular, is combined in stoichiometric proportion to the $SiO_2$ oxidizing agent, block 24, FIG. 2. This ensures that the $UF_4$ is completely reacted. The $SiO_2$ may, however, be mixed in slight excess of its stoichiometric proportion. The $SiO_2$ has a lower thermodynamic stability than any oxide of uranium, such as $UO_2$ or $U_3O_8$, which may be produced. Thus, when the combination is heated to sufficiently react the $SiO_2$ with the $UF_4$, block 26, the $SiO_2$ readily gives up its oxygen and an oxide of uranium and $SiF_4$ are produced, block 28. Depending on the oxide of uranium desired, additional oxygen ($O_2$) may be added to the reaction, block 30, shown in phantom.

The combination is heated, block 26, only to a temperature below the melting point of the $UF_4$, typically within a temperature range of 400° C. to 750° C. Heating the combination below the melting point of $UF_4$ prevents vaporization of the uranium, ensuring that the uranium does not enter the gaseous phase and thus contaminate the $SiF_4$ with radioactive uranium, and $SiF_4$ produced remains essentially pure because of the purity of the products combined.

Heating the stoichiometric combination below the melting point of $UF_4$ further ensures that the $UF_4$ completely reacts with the $SiO_2$ oxidizing agent, because no unreacted uranium is lost to the $SiF_4$. The gaseous $SiF_4$ and solid oxide of uranium are easily separated so that the nonradioactive $SiF_4$ may be removed, block 32.

Once the $SiF_4$ has been removed, block 32, for example by scrubbing the $SiF_4$ using an adsorbent bed or combining the $SiF_4$ with a reactive agent to separate out the $SiF_4$, the $SiF_4$ can be collected, block 34. The $SiF_4$ may be recovered by heat decomposition of post scrubbing residue, well known in the art. Scrubbing is not a necessary limitation of the present invention as the $SiF_4$ may be directly collected.

Thus, by heating $UF_4$ below its melting point ensures not only that the $SiF_4$ is not contaminated by unreacted uranium, but that all the $UF_4$ is reacted due to the stoichiometric proportions in which the combination was mixed, producing a valuable oxide of uranium.

TABLE 1

| OXIDE | ENTHALPY OF FORMATION (-$\Delta H_f°298$) KCAL/MOLE |
|---|---|
| $U_3O_8$ | 854.1 |
| $UO_2$ | 259.0 |
| $SiO_2$ | 217.0 |

Because $SiO_2$ has a lower enthalpy of formation than either $U_3O_8$ or $UO_2$, as shown in table 1, it readily gives up its oxygen which is readily accepted by the uranium, which has an affinity for oxygen, to produce $UO_2$, or $U_3O_8$, and $SiF_4$ according to the reactions:

$$UF_4(s) + SiO_2(s) \rightarrow UO_2(s) + SiF_4(g) \qquad (1)$$

$$3UF_4(s)+3SiO_2(s)+O_2(g) \rightarrow U_3O_8(S)+3SiF_4(g) \qquad (2)$$

Heating the combination below the melting point of $UF_4$ ensures no radioactive carryover into the fluorine compound, as well as no contamination of the fluorine compound.

EXAMPLE 1

An amount of 5.1 grams of $UF_4$ was combined with 1.0 grams of fumed silicon dioxide (Alfa AESAR $SiO_2$ –99.8%, –325 mesh, 400 m²/gm). The combination was vigorously shaken for ten minutes to thoroughly mix the combination. The combination 38, FIG. 3, was transferred to a high density, non-porous, alumina (99.8%) ceramic crucible 40. The crucible was then placed at the bottom of larger vessel 42, made of the same material and sealed with corrosion resistant monel metal cap 44 and ultra high temperature RTV silicon gasket compound 46 to provide a gas tight seal. Cap 44 has inlet ports 48 and outlet port 50 for allowing the gas to flow through vessel 42.

Figure 3:
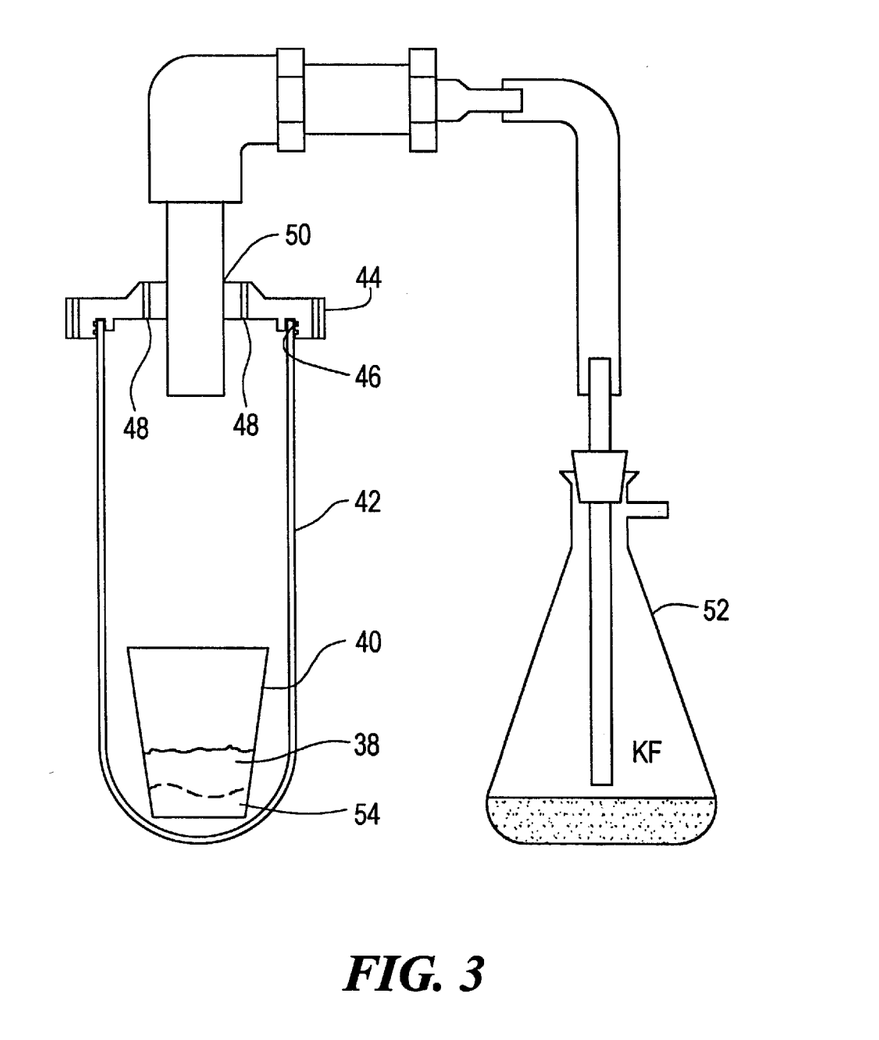
FIG. 3 is a schematic diagram of the apparatus used to produce the silicon tetrafluoride according to the present invention.

Sealed vessel 42 was placed in a crucible furnace, not shown, and heated to 700° C. in 3°/min. increments and maintained for three hours thereafter. Vessel 42 was cooled to ambient temperature in 3°/min. increments and crucible 40 removed from vessel 42. Post reaction residue 54, shown in phantom, was dark brown and flowed easily from crucible 40. Conversion of $UF_4$ to $U_3O_8$ and $UO_2$ was essentially complete, nearly 100% yield as determined by percent dissolution in nitric acid.

Uranium oxides, namely $UO_2$ and $U_3O_8$, are very soluble in concentrated nitric acid while $UF_4$ is relatively inert and is slow and difficult to dissolve. This behavior can be used to test for the presence of unreacted $UF_4$ in the residue of the reactor chamber. One gram of residue is added to 5 ml of concentrated nitric acid followed by the addition of 3 ml of distilled $H_2O$. The resultant mixture is then thoroughly stirred for twenty minutes after which the solution is filtered to separate any undissolved solids. The filtered solids are then washed thoroughly with $H_2O$, dried and weighed. The percent of unreacted $UF_4$ is calculated from:

% Unreacted $UF_4$=(weight of filter residue/one gram of initial solid residue)×100.

The overall reaction yield is given by:

Yield=100% Unreacted $UF_4$

Verification of the $SiF_4$ may be done in several ways to include collection of the gaseous $SiF_4$ and performing gas analysis, passing the $SiF_4$ over an adsorbent bed and analyzing the bed material, or chemically reacting the $SiF_4$ in a trap and analyzing the product using x-ray diffraction.

The reaction occurring in the trap in this particular example is given by the reaction:

$$2KF(s)+SiF_4(g) \rightarrow K_2SiF_6(s) \qquad (3)$$

Similar reactions can also be produced by using other alkaline metal fluorides such as sodium fluoride (NaF), lithium fluoride (LiF) and barium fluoride (BaF) in the trap.

Figure 4:
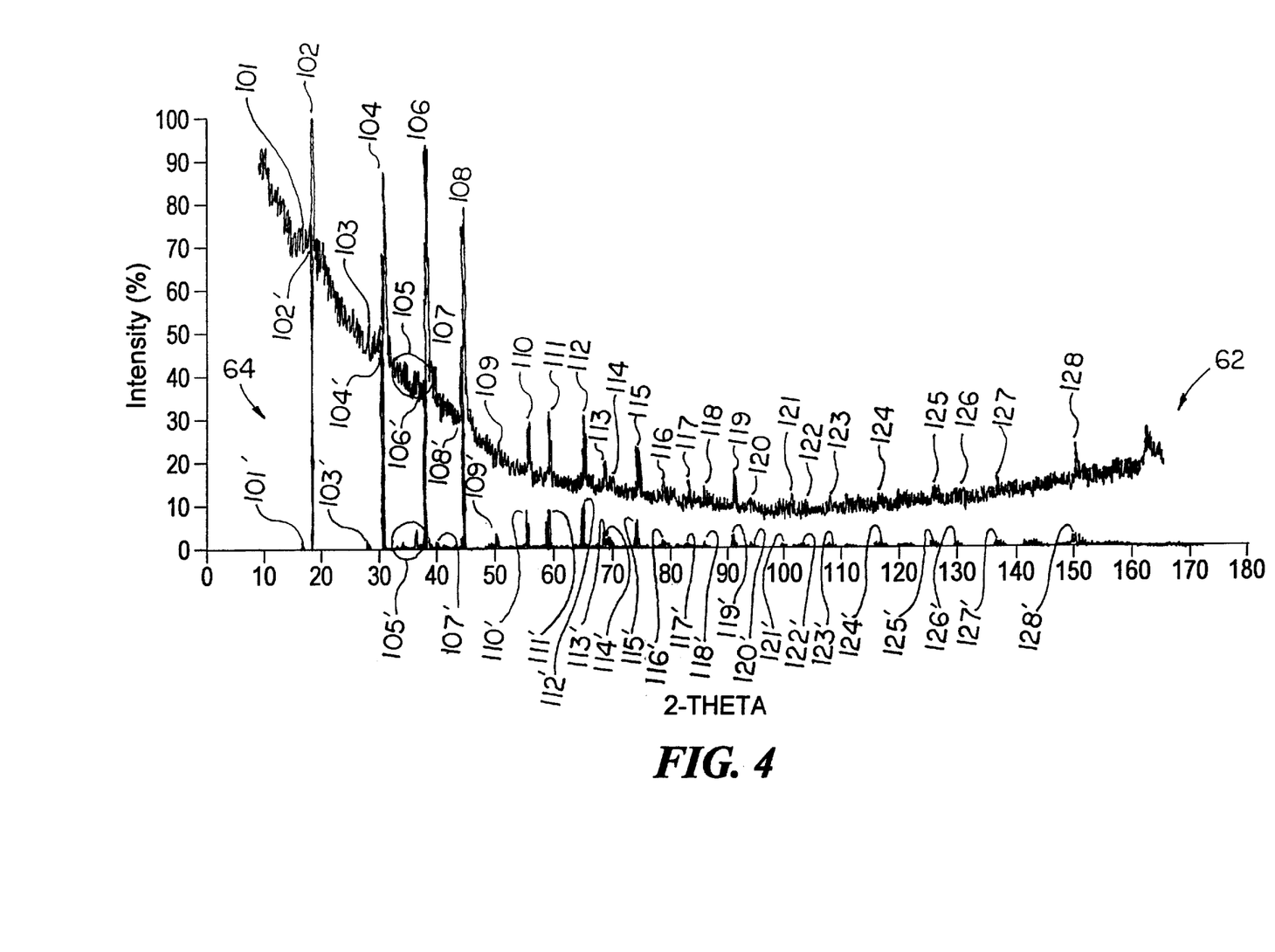
FIG. 4 is a representation of an x-ray diffraction analysis performed on potassium hexafluorosilicate, obtained from scrubbing the silicon tetrafluoride produced by the apparatus of FIG. 3 according to the method of the present invention, compared to a standard x-ray diffraction pattern for potassium hexafluorosilicate to verify the presence of silicon tetrafluoride.

Verification of $SiF_4$ was done indirectly using x-ray powder diffraction analysis of the potassium hexafluorosilicate ($K_2SiF_6$) produced in trap 52. X-ray diffraction pattern 62, FIG. 4, of the reaction residue was compared to theoretical reference pattern 64 for $K_2SiF_6$. The correlation of peaks 101–126 of reaction residue pattern 62 and peaks 101'–126' of reference pattern 64 indicates the presence of $K_2SiF_6$ in the residue. Moreover, the absence of non-correlating peaks confirms that no uranium contaminates the $SiF_4$.

Accordingly, verification of $K_2SiF_6$ indirectly verifies the presence of $SiF_4$ based on equation (3) set forth above and confirms that there is no uranium carryover.

Figure 5:
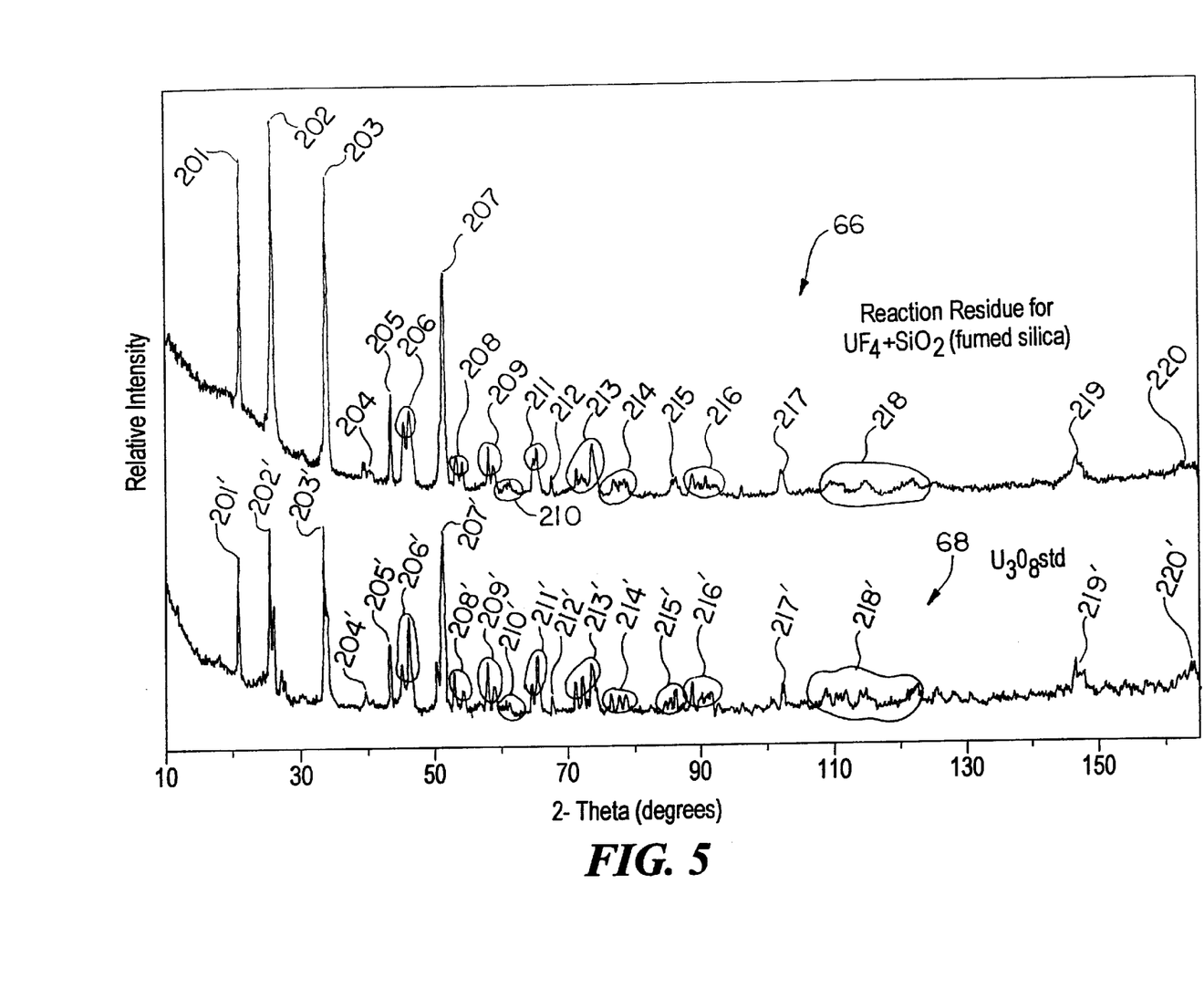
FIG. 5 is a representation of an x-ray diffraction analysis, similar to FIG. 4, performed on the reaction residue produced by the apparatus of FIG. 3 compared to the standard x-ray diffraction pattern for $U_3O_8$.

Verification of complete reaction of the products to produce oxides of uranium was achieved using x-ray powder diffraction analysis on post reaction residue 54. X-ray diffraction pattern 66, FIG. 5, of the product residue was compared to standard x-ray diffraction reference pattern 68, for $U_3O_8$. The correlation of peaks 201–220 of reaction residue pattern 66 with peaks 201'–220' of $U_3O_8$ reference pattern 68 indicates the presence of $U_3O_8$ in the post reaction residue. Moreover, the absence of non-correlating peaks indicates the absence of unreacted uranium.

EXAMPLE 2

An amount of 29.9 grams of $UF_4$ was combined with 6.0 grams $SiO_2$: Celite® brand pool filter sand consisting of a mixture of silica quartz (CAS#91053-39-3) and cristobalite (CAS#68855-54-9). The $SiO_2$ may, however, include other naturally occurring mineral forms of $SiO_2$ including quartz, cristobalite, tridymite, lechatelierite, stishovite, chalcedony, coesite, silica glass or mixtures thereof. The combination was vigorously shaken for ten minutes to thoroughly mix the combination. The combination 38', FIG. 6, was transferred to a high density, non-porous, alumina (99.8%) ceramic crucible 40'. The crucible was then placed at the bottom of larger vessel 42', made of the same material and sealed with corrosion resistant monel metal cap 44' and ultra high temperature RTV silicon gasket compound 46'.

Figure 6:
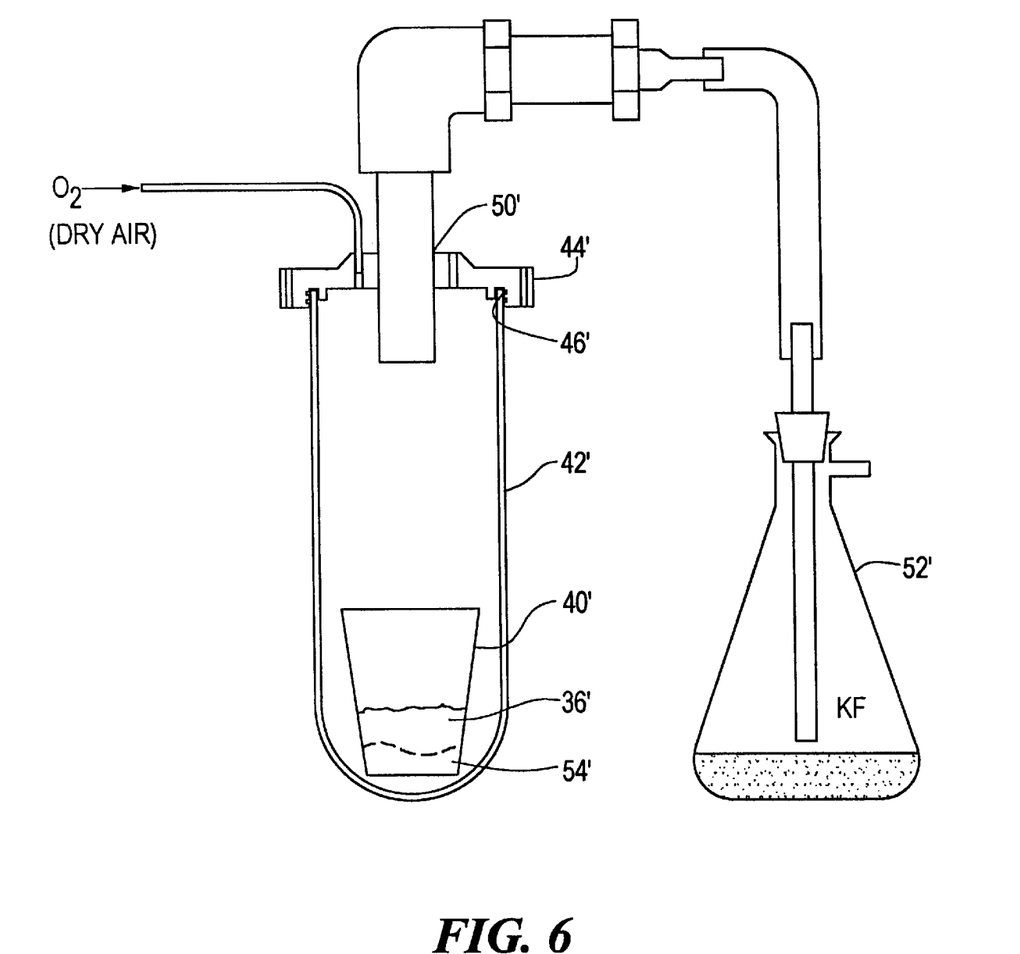
FIG. 6 is a schematic diagram, similar to FIG. 3, of the apparatus used to produce silicon tetrafluoride with the addition of oxygen (as dry air) to the reaction.

Sealed vessel 42' was placed in a crucible furnace, not shown. For this particular example, one of inlet ports 48 was capped and one was connected to a supply of high purity, dry air including $O_2$. Trap vessel 52', containing potassium fluoride (KF) for scrubbing the $SiF_4$ reaction effluent, was connected to outlet port 50'.

Prior to heating, the flow of air was initiated at 50–100 cc/min and maintained throughout the experiment. Vessel 42' was heated to 700° C. in 3°/min. increments and maintained for four and one half (4.5) hours thereafter. Vessel 42' was cooled to ambient temperature in 3°/min. increments and crucible 40' removed from vessel 42'. Post reaction residue 54', shown in phantom, was dark brown in color and flowed easily from crucible 40'. Conversion of $UF_4$ to $U_3O_8$ and was again essentially complete, nearly 100% yield as determined by percent dissolution in nitric acid.

Figure 7:
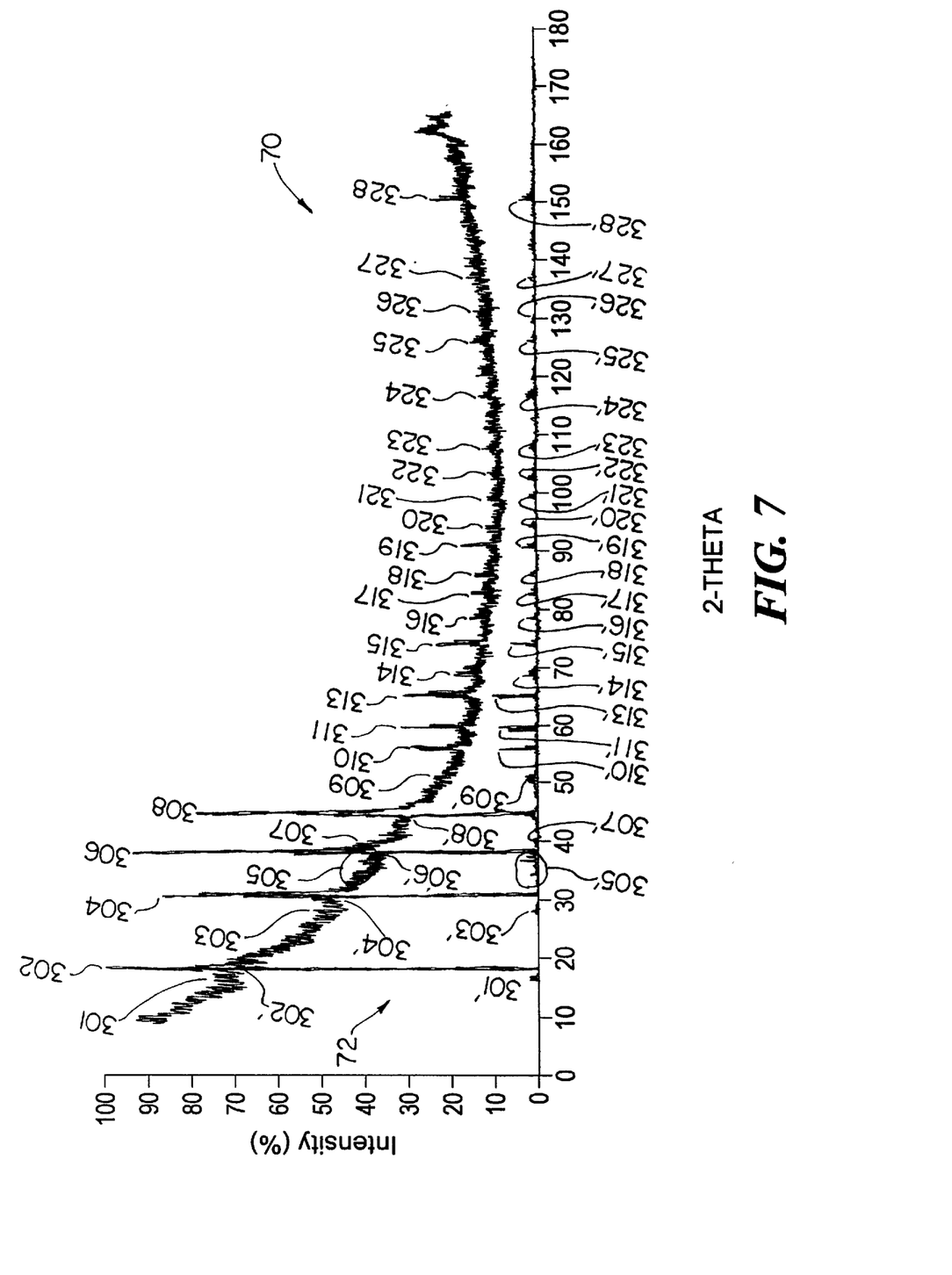
FIG. 7 is a representation of an x-ray diffraction analysis, similar to FIG. 4, performed on potassium hexafluorosilicate, obtained from scrubbing the silicon tetrafluoride produced by the apparatus of FIG. 6 according to the method of the present invention, compared to the standard diffraction pattern for potassium hexafluorosilicate to verify the presence of $SiF_4$.

Verification of $SiF_4$ was done indirectly using x-ray diffraction on the potassium hexafluorosilicate ($K_2SiF_6$) produced in trap 52'. X-ray diffraction pattern 70, FIG. 7, of the reaction residue was compared to reference pattern 72 for $K_2SiF_6$. The correlation of peaks 301–328 of reaction pattern 70 and peaks 301'–328' of reference pattern 72 indicates the presence of $K_2SiF_6$ in the residue.

Accordingly, verification of $K_2SiF_6$ indirectly verifies the presence of $SiF_4$ based on equation (3) set forth above and confirms that there is no uranium carryover.

Figure 8:
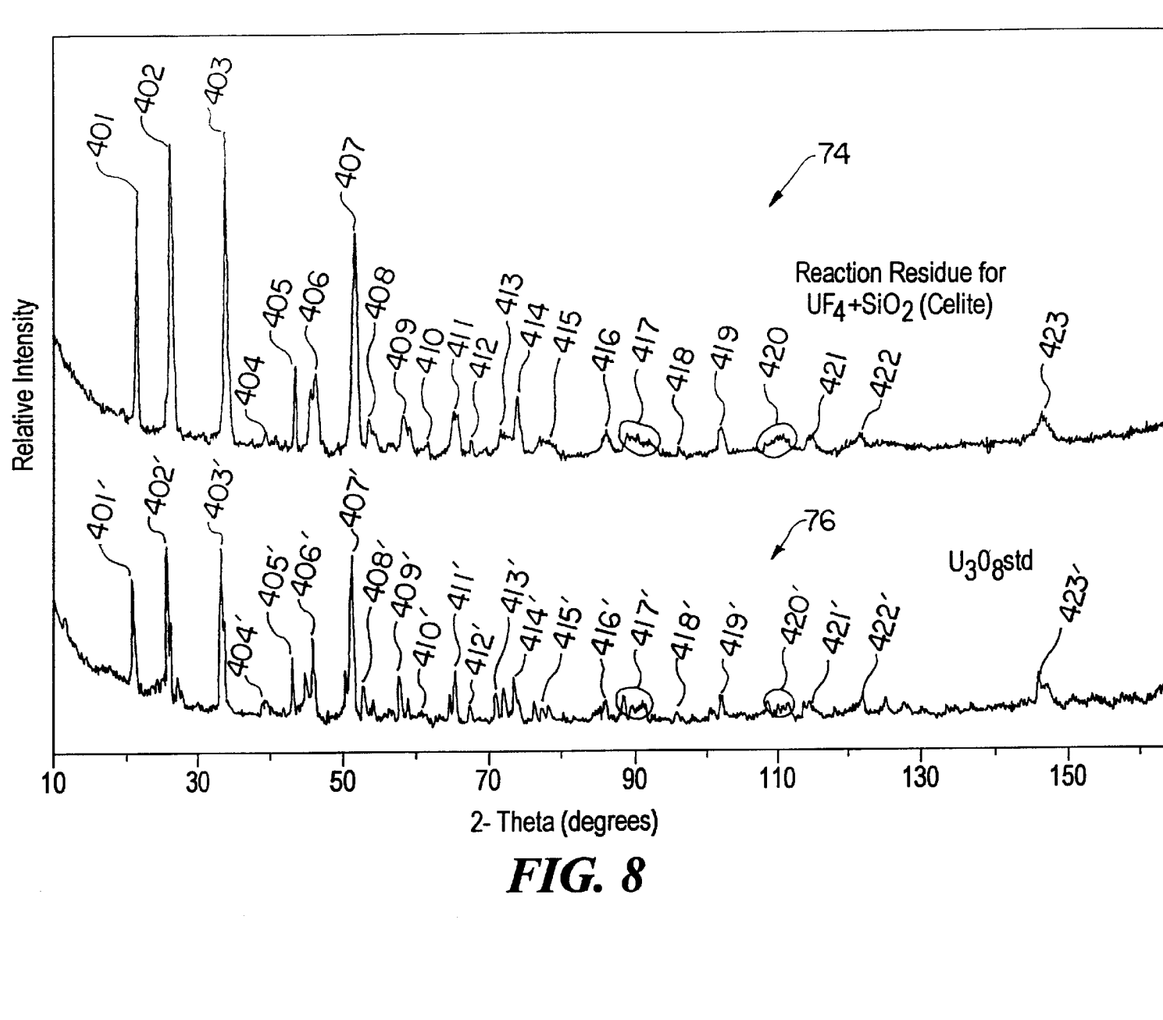
FIG. 8 is a representation of an x-ray diffraction analysis, similar to FIG. 5, performed on the reaction residue produced by the apparatus of FIG. 6 compared to the standard x-ray diffraction for $U_3O_8$.

Verification of complete reaction of the products to produce oxides of uranium was achieved using x-ray powder diffraction analysis on post reaction residue 54'. X-ray diffraction pattern 74, FIG. 8, of the product residue was compared to standard x-ray diffraction reference pattern 76 for $U_3O_8$. The correlation of peaks 401–423 of reaction residue pattern 74 with peaks 401'–423' of $U_3O_8$ reference pattern 76 indicates the presence of $U_3O_8$ in the post reaction residue. Moreover, the absence of non-correlating peaks confirms the absence of unreacted uranium.

Thus, the method according to the present invention not only reacts all of the uranium, but produces a silicon tetrafluoride compound of very high purity by heating the stoichiometric combination below the melting point of the uranium tetrafluoride. The uranium tetrafluoride completely reacts to produce uranium oxide without radioactive carry-over into the silicon tetrafluoride compound by-product producing a commercially valuable product without requiring additional processing or generating other low level radioactive wastes. Moreover, converting uranium oxide from uranium tetrafluoride, rather than directly from uranium hexafluoride, produces less radioactive and diluted HF than if all the fluorine in $UF_6$ was converted to HF.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A method for producing silicon tetrafluoride comprising:
    combining uranium tetrafluoride and silicon dioxide;
    heating the combination below the melting point of the uranium tetrafluoride to sufficiently react the uranium tetrafluoride and the silicon dioxide to produce non-radioactive silicon tetrafluoride and an oxide of uranium; and
    removing the silicon tetrafluoride.

2. The method of claim 1 in which combining includes combining the uranium tetrafluoride and the silicon dioxide in stoichiometric proportion.

3. The method of claim 2 in which further including introducing oxygen to the reaction.

4. The method of claim 1 in which heating includes heating the combination in the temperature range of 400° C. to 750° C.

5. The method of claim 1 in which the uranium oxide produced includes $U_3O_8$.

6. The method of claim 1 in which the uranium oxide produced includes $UO_2$.

7. The method of claim 1 in which the uranium tetrafluoride includes powdered uranium tetrafluoride.

8. The method of claim 1 in which the silicon dioxide includes fumed silica.

9. The method of claim 1 in which the silicon dioxide includes a mixture of quartz and cristobalite.

10. The method of claim 1 in which the silicon dioxide includes at least one of quartz, cristobalite, tridymite, lechatelierite, stishovite, chalcedony or coesite.

11. The method of claim 1 in which the silicon dioxide includes silica glass.

12. A method for producing an alkali metal hexafluorosilicate comprising:
    combining uranium tetrafluoride and silicon dioxide;
    heating the combination below the melting point of the uranium tetrafluoride to sufficiently react the uranium tetrafluoride and the silicon dioxide to produce non-radioactive silicon tetrafluoride and an oxide of uranium;
    removing the silicon tetrafluoride; and
    collecting the silicon tetrafluoride by further reacting the silicon tetrafluoride with an alkali metal fluoride to produce an alkali metal hexafluorosilicate compound.

13. The method of claim 12 in which the alkali metal fluoride is selected from the group consisting of sodium fluoride, lithium fluoride, barium fluoride and potassium fluoride.

* * * * *